US 7,362,065 B2

(12) United States Patent
Takano

(10) Patent No.: US 7,362,065 B2
(45) Date of Patent: Apr. 22, 2008

(54) REGENERATIVE BREAKING SYSTEM FOR ELECTRIC VEHICLE

(75) Inventor: Yukiyasu Takano, Mori-machi (JP)

(73) Assignee: Yamaha Motor Electronics Co Ltd, Mori-machi (JP)

( * ) Notice: Subject to any disclaimer, the term of this patent is extended or adjusted under 35 U.S.C. 154(b) by 302 days.

(21) Appl. No.: 10/907,594

(22) Filed: Apr. 7, 2005

(65) Prior Publication Data

US 2005/0231144 A1    Oct. 20, 2005

(30) Foreign Application Priority Data

Apr. 19, 2004  (JP)  ............................. 2004-122400

(51) Int. Cl.
*H02P 3/14*    (2006.01)
(52) U.S. Cl. ...................... 318/376; 318/139; 318/370; 318/373
(58) Field of Classification Search ........ 318/432–434, 318/493, 370–376, 700, 439, 139
See application file for complete search history.

(56) References Cited

U.S. PATENT DOCUMENTS

| | | | | |
|---|---|---|---|---|
| 4,095,153 | A * | 6/1978 | Matty et al. ................. | 318/376 |
| 4,363,999 | A * | 12/1982 | Preikschat ................... | 318/53 |
| 4,384,240 | A * | 5/1983 | Sloan .......................... | 318/255 |
| 4,401,926 | A * | 8/1983 | Morton et al. .............. | 318/376 |
| 4,408,147 | A * | 10/1983 | Gabel .......................... | 318/493 |
| 5,642,023 | A * | 6/1997 | Journey ....................... | 318/493 |
| 5,764,009 | A * | 6/1998 | Fukaya et al. ............. | 318/300 |
| 5,793,175 | A * | 8/1998 | Journey ....................... | 318/493 |
| 5,814,958 | A * | 9/1998 | Journey ....................... | 318/493 |
| 6,288,508 | B1 * | 9/2001 | Taketomi et al. ........... | 318/376 |

\* cited by examiner

*Primary Examiner*—Paul Ip
(74) *Attorney, Agent, or Firm*—Ernest A. Beutler

(57) ABSTRACT

Several embodiments of electric vehicle control and control apparatus wherein the amount of regenerative braking of the vehicle and the type of braking is determined by current conditions to provide simpler and more effective control regardless of condition of the power source for the vehicle.

26 Claims, 7 Drawing Sheets

REGENERATIVE BREAKING SYSTEM FOR ELECTRIC VEHICLE

BACKGROUND OF THE INVENTION

This invention relates to an electric motor driven vehicle and more particularly to one having an improved regenerative braking system for a DC shunt powered driving motor therefore.

As shown in Japanese Published Patent Application Hei 10-309005 (A) it has been proposed to employ a DC shunt motor for the driving of electric powered vehicles such as golf carts and the like. There the armature coil and the field coil are connected in parallel to a common electric power source. As is known, it is possible to energize the armature coil and the field coil independently from each other. The amount of current supplied to the armature coil is controlled based on the position of a operator controlled vehicle speed control such as, for example, an accelerator pedal. Then a specific current is supplied to the field coil depending on the armature current value. This is generally done by reference to a field map that is constant or pre-designed for each motor. This produces a specific torque from the electric motor to control the operation required by the various operating conditions of the electric vehicle.

In these types of electric vehicles there are also provided regenerative braking functions according to certain driving conditions. For example it is common to decelerate the vehicle to a specified speed without freewheeling when the accelerator control is released. In addition an arbitrary speed may be limited on a downhill run with the accelerator control remaining on. Also it is common to detect motion of unattended vehicle and apply braking of the vehicle and/or switch traveling direction between forward and reverse with the accelerator control remaining on during traveling. These controls are conventionally performed usually by controlling the voltages applied to the armature and field coils.

However, the voltage and capacity of the battery change according to conditions of use. Thus the torque of regenerative braking changes with the voltage and capacity of the battery and stabilized regenerative operation cannot be obtained. That is, as the characteristic among revolution speed (N), torque (T), and current (I) of the motor changes along with the battery voltage, it would be necessary to make a map of N-T-I characteristic for each battery voltage. This makes a control program complicated, requiring a large memory capacity and a large-sized circuit.

As an alternative in U.S. Pat. No. 6,686,712 it has been proposed to use various regenerative controls are performed according to vehicle speeds and independently of the position of the accelerator control. This, however, can give rise to a situation that control performed could be different from the intention of the operator. For example, if the vehicle decelerates on an uphill run, the armature current could become excessive even if the position of the accelerator control does not call for it.

It is, therefore, one principal object of the invention to compensate for the regenerative braking operations depending on the status of the battery depending on its voltage and capacity.

It is another principal object of the invention to provide vehicle speed control in response to the operator's intentions.

It is a still further object of the invention to provide a shunt motor control capable of maintaining constantly stabilized motor torque regardless of changes in voltage and capacity of the battery.

SUMMARY OF THE INVENTION

A first feature of this invention is adapted to be embodied in a regenerative braked shunt motor operated vehicle powered from a battery and having an armature coil and a field coil. In accordance with the invention the current values in the coils is monitored during vehicle operation and the regenerative braking is varied in response to the measured values.

Another feature of the invention is adapted to be embodied in a method of applying regenerative braking to shunt motor operated vehicle comprising the steps of monitoring the current values in the coils during vehicle operation and varying the regenerative braking response to the measured values.

DETAILED DESCRIPTION

Figure 1:
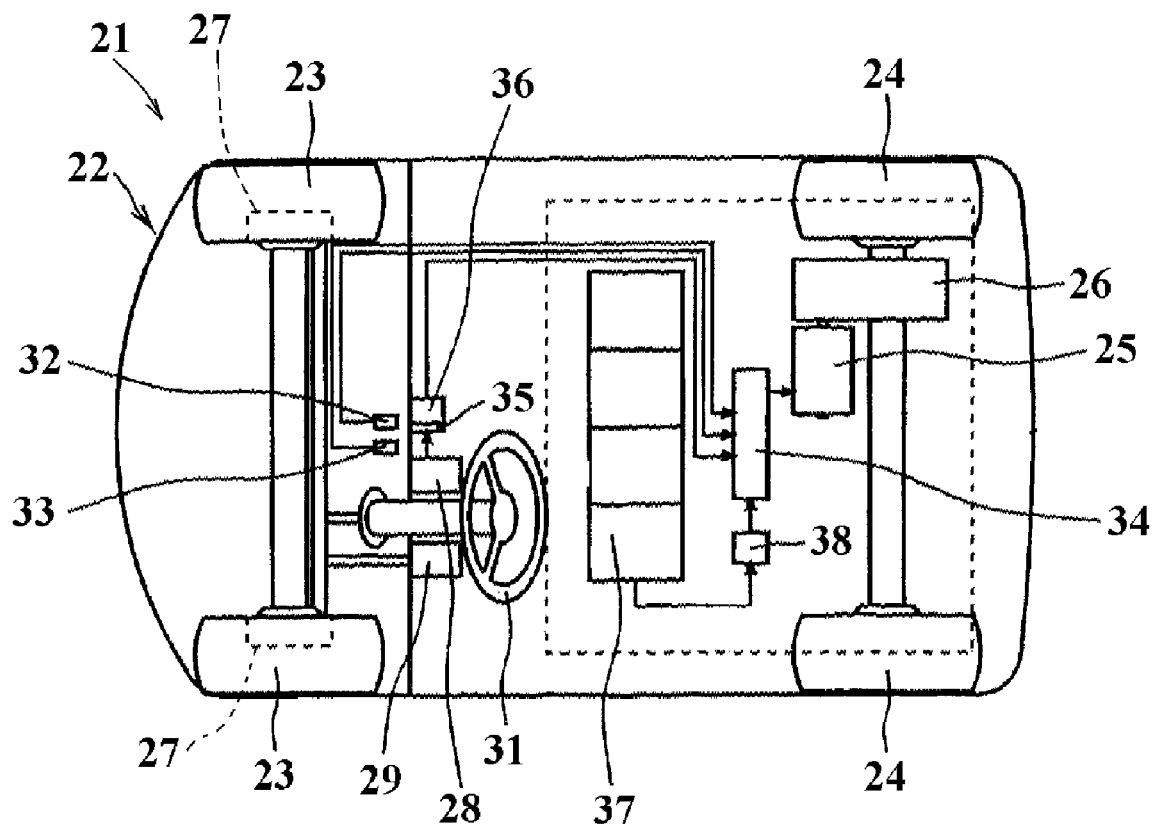
FIG. 1 is a partially schematic, top plan view of an electric powered vehicle constructed and operated in accordance with the invention.

Referring now in detail to the drawings and initially to FIG. 1, an electrically powered vehicle such as a golf cart, as an example of vehicle with which the invention may be practiced is identified generally by the reference numeral 21. This golf cart 21 is provided with a body, frame 22 that rotatably supports in any desired manner paired front wheels 23 and rear wheels 24. In the illustrated embodiment, the rear wheels 24 are driven by a shunt type electric motor 25 through a transmission 26. Associated with some or all of the wheels 23 and 24 (only the front wheels 23 in the illustrated embodiment) are brakes 27 of any desired type.

An operator may be seated on a suitable seat (neither of which are shown) behind an accelerator pedal 28, for controlling the speed of the electric motor 25, a brake pedal 29, for operating the wheel brakes 27, and a steering wheel 31, for steering the front wheels 23 in any desired manner.

Also juxtaposed to the operator's position is a main switch 32, and a direction control switch 33, for controlling the direction of travel of the golf cart 21 by controlling the direction of rotation of the motor 25. The main switch 32 and the direction control switch 33 are connected to a controller 34. Operation of the accelerator pedal 28 is transmitted to an on off pedal switch 35 and an accelerator opening degree sensor 36 connected to the controller 34, to send on or off state of the accelerator 28 and its degree of opening to the controller 34.

A plurality of batteries 37 as power sources are mounted suitably on the body frame 22 and are connected through a relay 38 to the controller 34.

Figure 2:
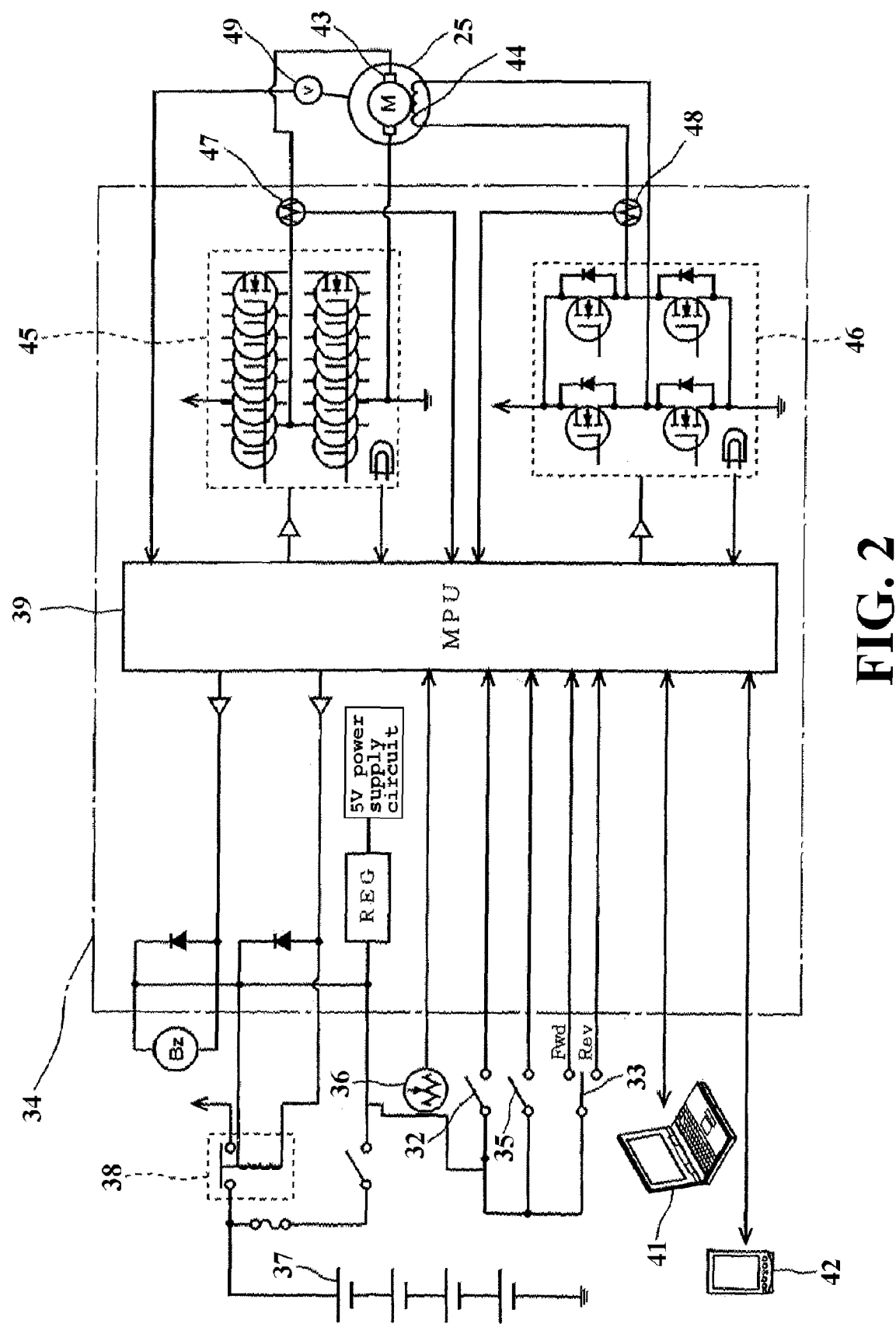
FIG. 2 is a schematic electrical diagram showing the motor control on accordance with the invention.

Referring now to FIG. 2 this is a circuit block diagram of the electric vehicle 21 using the shunt motor 25 and embodying the invention. Electric power sent from the batteries 37 is supplied through the relay 38 to an MPU 39 having a memory and a control circuit to supply the necessary power to various driving circuits as will be described.

Signals from the main switch 32, the pedal switch 35, the direction control switch 33 and the accelerator opening sensor 36 are inputted to the MPU 39, from which a command signal for drive-controlling the motor 25 is outputted. Further it is possible to interconnect a personal computer 41 or an external terminal device 42 and the MPU 39 through wire or wireless means such as infrared rays either to input a control program into the MPU 39 or read contents stored in the MPU 39.

Continuing to refer to FIG. 2, the motor 25 is of the shunt coil type with an armature coil 43 and a field coil 44 connected to an armature driving circuit 45 and a field driving circuit 46, respectively.

The armature driving circuit 45 is a bipolar circuit formed as shown in FIG. 2 with upper and lower rows of FETs, eight in each row. Driving current is supplied to the armature coil 43 by alternately switching on or off the upper and lower rows of FETs.

The field driving circuit 46 is an H-bridge circuit formed with four FETs and capable of changing the direction of current by simultaneously turning on or off the diagonally opposing FETs. It should be noted that the number of the FETs used in the armature driving circuit 45 and the field driving circuit 46 is not limited to that mentioned above but may be appropriately determined according to the amount of current required for the motor 25.

A current sensor 47 is interposed between the armature driving circuit 45 and the armature coil 43 of the motor 25. In a like manner, current sensor 48 is interposed between the field driving circuit 46 and the field coil 44 of the motor 25. The current sensors 47 and 48 detect currents actually flowing through the coils 43 and 44 respectively. The detected currents of the motor driving command signals coming from the MPU 39 are feedback-controlled. In this way, the currents flowing in the armature and field sides are accurately controlled to produce torque in the motor 25 corresponding to the depression amount of the accelerator pedal. The motor 25 is provided with a speed sensor 49 made up of an encoder and other components.

A method of control by the controller 34, as shown in FIG. 2 will now be described by reference to the block diagram of FIG. 3

The input signal from the accelerator pedal 28 operated by the driver is amplified by an amplifier 51 and sent together with the vehicle speed signal from the speed sensor 49 to a vehicle speed determination circuit 52. The vehicle speed determination circuit 52 determines the speed of the vehicle 21 and determines whether or not the vehicle speed has exceeded a specified reference value (for example a limit speed of 22 km/h in a golf course). A determination result of the vehicle speed determination circuit 52 or a binary signal of determination on whether or not the vehicle speed has exceeded the specified limit speed, together with the signal from the accelerator pedal 28, is inputted to an armature command current operation circuit 53. In addition, the on/off signal of the pedal 28 from the pedal switch 35 and the accelerator opening (depression amount) signal from the accelerator opening sensor 36 are sent to the armature command current operation circuit 53 directly or through the vehicle speed determination circuit 52.

The armature command current operation circuit 53 is a circuit built within the MPU 39 shown in FIG. 2 to calculate a command current value for driving the motor 25 according to the accelerator pedal depression amount. This calculation is carried out for example with a map predetermined according to the accelerator pedal depression amount. The power source voltage from the batteries 37 is converted based on the calculated command current value into a coil driving voltage. The command current (Ia) of a calculated pulse width is applied to the armature coil 43 by a PWM control method.

The MPU 39 is provided with a map (Ia-f map) 54 for the field coil current (If) for driving the motor 25 at a maximum efficiency according to the armature coil current (Ia). A field coil current If is determined from the Ia-f map 54 according to the command current Ia of the armature coil 43 and inputted to a field command current operation circuit 55. The field command current operation circuit 55 converts the power source voltage from the batteries 37 into a coil driving voltage based on the If obtained with the map 54 and applies a command current (If) of a calculated pulse width to the field coil 44 by a PWM control method. Since the motor 25 is driven with the Ia and If calculated as described, a torque commensurate with the accelerator pedal depression amount is obtained.

In addition, regenerative braking is performed as shown in the following embodiment with the regenerative current corresponding to operating conditions based on the armature current Ia detected with the current sensor 47. This applies regenerative breaking when the operator releases the accelerator pedal 28. This will now be described by reference to FIGS. 4-6.

Figure 4:
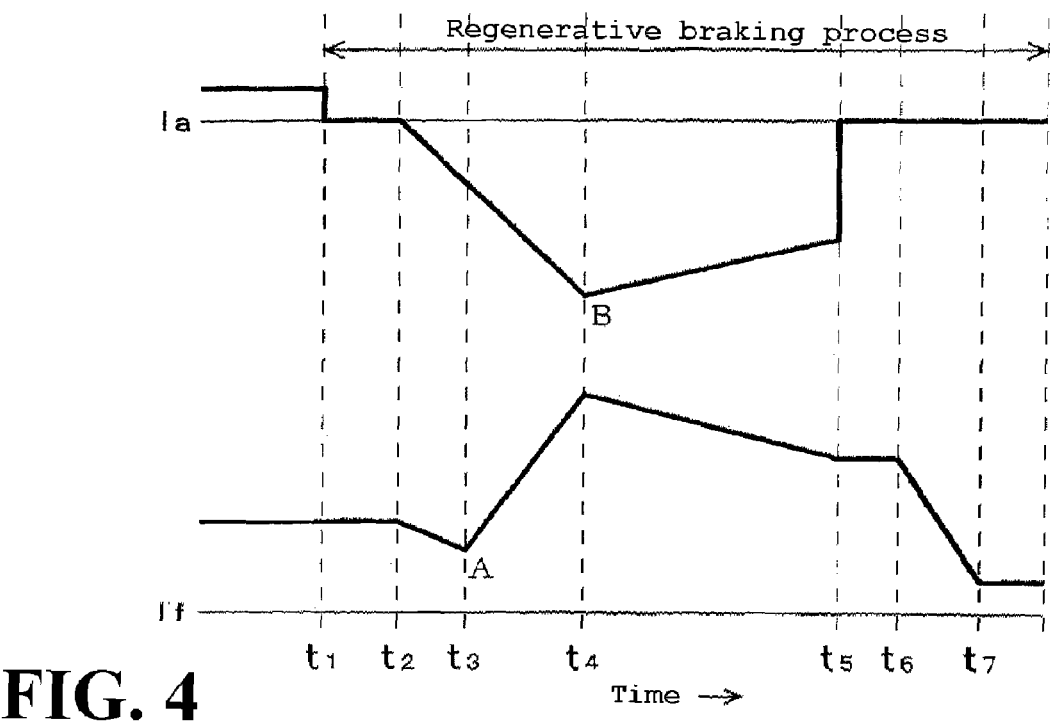
FIG. 4 is a graph of circuit control in accordance with the invention.

FIG. 4 is a chart showing how a regenerative braking process is applied at the time when the driver of the electric vehicle releases the accelerator pedal 28. The release of the accelerator pedal at the time $t_1$ is detected by the pedal switch 35 (FIG. 2). The horizontal axis represents elapsed time. At the same time as the driver releases the accelerator pedal 28 at a time $t_1$ when driving, the armature current Ia which has been flowing in the positive direction is set to zero. From the time $t_1$, the vehicle 21 coasts. After that, with a dwell interval of about several milliseconds interposed for electric stability, an armature current Ia is applied beginning at the time $t_2$ in a negative direction. This is in the regenerative direction opposite to the driving direction.

The armature current Ia is controlled by changing its pulse width by the PWM of the armature command current operation circuit 53. Up to the time $t_1$, a command current of a pulse width calculated according to the accelerator pedal opening up to that time is applied. From the time $t_1$ on, a command current with no substantial pulse signal with zero pulse width is applied. Next, from the time $t_2$ on, command current is applied while its pulse width being gradually increased by the PWM control of the armature command current operation circuit 53. Due to the change in the pulse width, regenerative current increases gradually. The rate of increase in the regenerative current (gradient toward the negative side of the graph) is predetermined with a fixed gain constant. In this way, regenerative current is obtained within the pulse width and the freewheeling speed decreases gradually.

Figure 5:
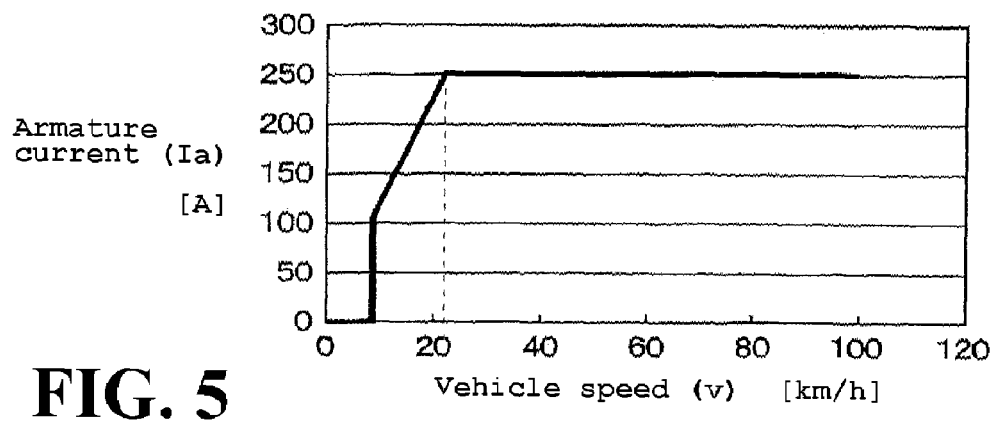
FIG. 5 is a graph showing the armature circuit control employed in FIG. 4.

The amount of regenerative armature current Ia is determined with the v-Ia map of FIG. 5 representing the relationship between the vehicle speed v and the armature current Ia. For example, it is programmed as follows. In cases where the vehicle speed when the driver releases the accelerator pedal is not lower than the limit speed of 22 km/h in the golf course, the armature current Ia takes a maximum value of 250 amperes. When the vehicle speed slows down to 22 km/h or below by braking, the current value becomes a value commensurate with the vehicle speed. When the vehicle speed slows down below 10 km/h, the armature current Ia is made to zero so that regenerative braking is over. These values for the vehicle speeds may be set as desired by the program.

Figure 6:
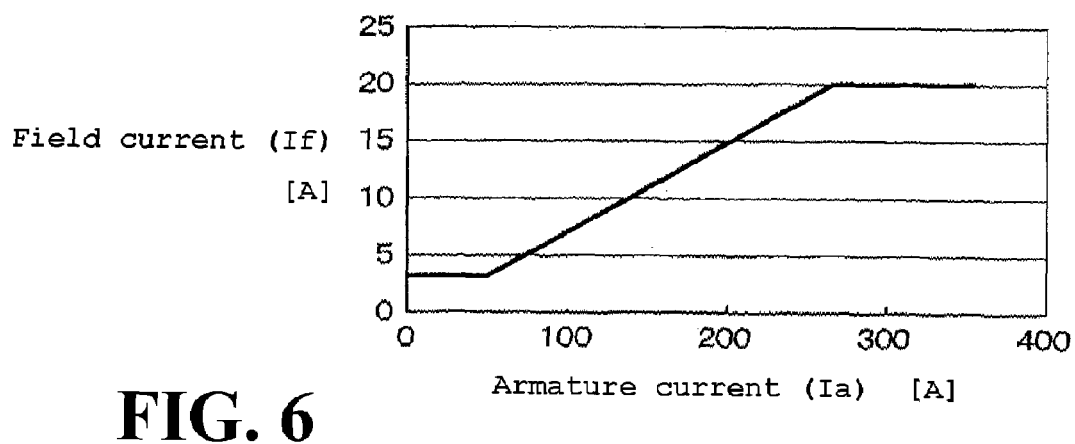
FIG. 6 is a graph showing the field current control employed in FIG. 4.

The field current amount corresponding to the armature current Ia is determined according to the Ia-f map shown in FIG. 6 (counterpart of the Ia-f map 54 of FIG. 3) representing the relationship between the armature current Ia and the field current If.

Regenerative braking is performed with the armature current Ia and the field current If determined as described above. The regenerative braking starts from a time $t_3$ slightly after the time $t_2$ by applying the current If to the field coil 44.

The field current If is of a value corresponding to the armature current Ia of up to the time $t_1$, up to the time $t_2$ and decreases from the time $t_2$ on. This rate of decrease (gradient of the graph) is predetermined with a fixed gain constant. From the time $t_3$ on, field current If is applied according to the Ia-f map to obtain regenerative current corresponding to the Ia. The time $t_3$ (point A) is the time point when the value of If according to the Ia-f map becomes greater than the value of If up to that time. After the point A, If is applied according to the Ia-f map.

The time $t_4$ (point B) is the time point when the value of armature current Ia obtained with the v-Ia map of FIG. 5 becomes greater. From a time $t_4$ on, the armature current Ia is calculated according to the v-Ia map while the field current If is calculated according to the Ia-f map.

When the vehicle decelerates down to 10 km/h as set from the v-Ia map of FIG. 5 at a time $t_5$, the armature current Ia becomes zero. The field current If starts decreasing at a time $t_6$ with a little delay and takes a minimum value at a time $t_7$ when the regenerative braking process comes to an end.

After that, when the driver intends to stop the vehicle, the driver operates the brake pedal. In order to speed up, the driver operates the accelerator pedal. Incidentally, it is also possible to design a v-Ia map to perform regenerative braking until the vehicle speed comes to zero.

Figure 7:
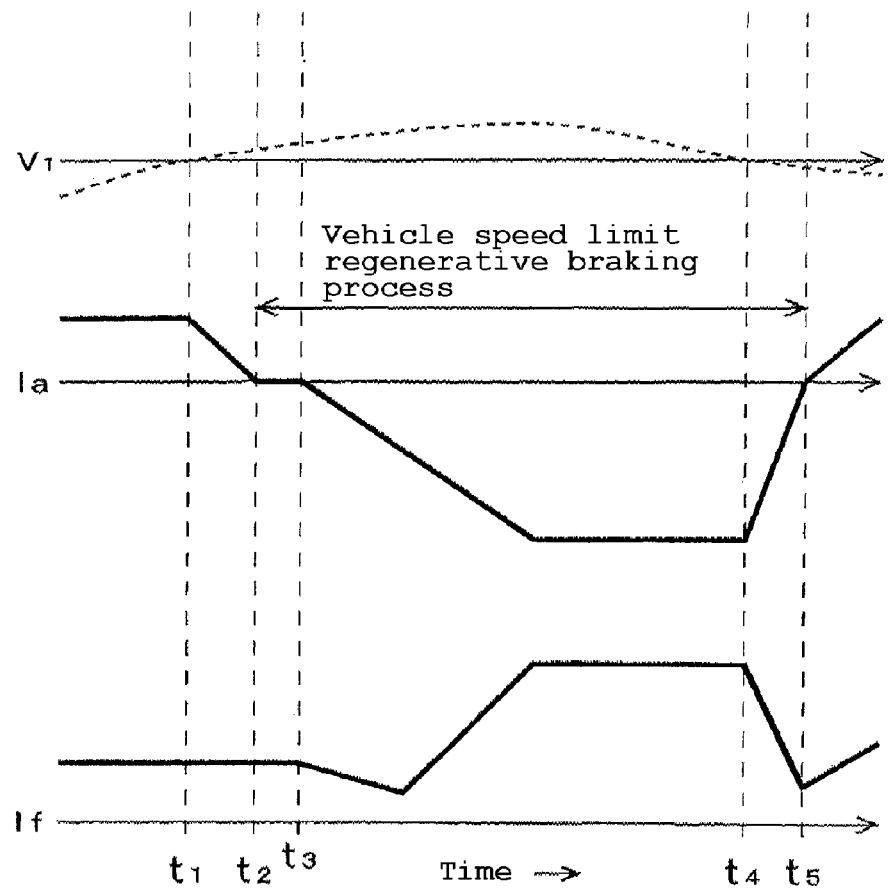
FIG. 7 is a graph, in part similar to FIG. 4, of circuit control in accordance with another feature of the invention.
Figure 8:
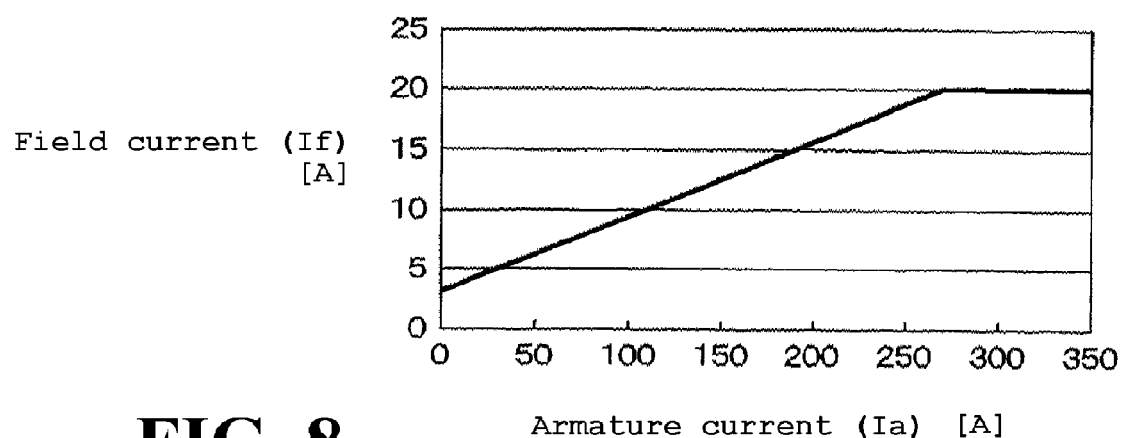
FIG. 8 is a graph showing the field current control employed in FIG. 7.

Another embodiment of regenerative braking is shown in FIGS. 7 and 8. This embodiment applies regenerative braking to limit maximum vehicle speed. Referring first to FIG. 7 this is a time chart showing a regenerative braking process for controlling that the vehicle does not exceed a limit speed even when the driver continues depressing the accelerator pedal 28. The dotted curve denotes the vehicle speed during this operation.

In case the vehicle speed exceeds the limit speed $v_1$ at a time $t_1$, caused by, for example the vehicle going down an incline, the armature current Ia of positive direction is lowered to zero toward a time $t_2$ by decreasing pulse width by PWM control 53. After a lapse of several milliseconds, predetermined by a timer, from a time $t_3$ on, armature current Ia is applied in negative direction to start regenerative braking.

Figure 3:
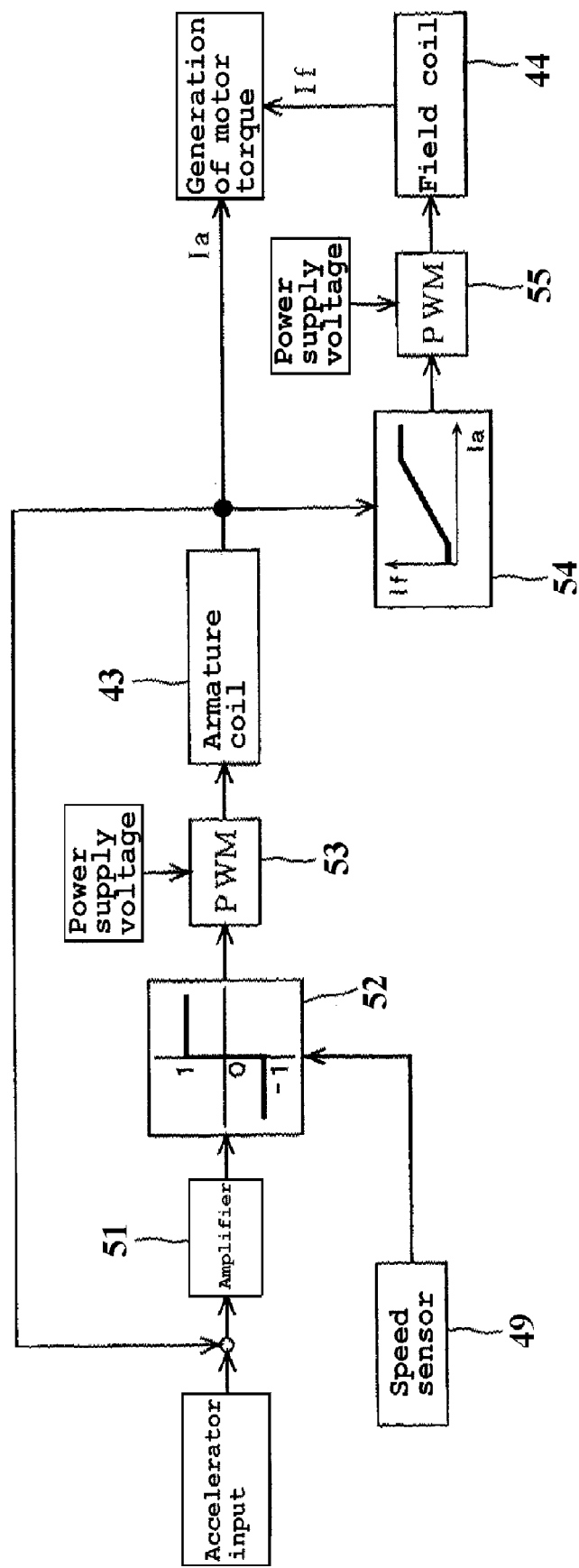
FIG. 3 is a block diagram of a part of the control shown in FIG. 2.

In this case, whether or not the vehicle speed has exceeded the limit speed $v_1$ is determined with the vehicle speed determination circuit 52 shown in FIG. 3. If it has, control is made to start regenerative braking. The field current If is controlled according to the Ia-f map of FIG. 8. The armature current Ia during regenerative braking increases in proportion to the amount the vehicle speed exceeds the limit value.

After the armature current Ia in negative direction flows to start regenerative braking, the vehicle speed may still increases due to inertia for some period of time, and then decreases. When the vehicle speed lowers down to the limit speed at a time $t_4$, Ia is decreased according to a predetermined gain constant down to zero at a time $t_5$ then the regenerative braking is stopped.

If the driver continues depressing the accelerator pedal 28, after the time $t_5$ at which regenerative braking is stopped, the armature current Ia increases in positive direction to continue driving state of the vehicle. If the vehicle speed again exceeds the limit speed $v_1$, the regenerative braking as aforenoted is repeated.

Figure 9:
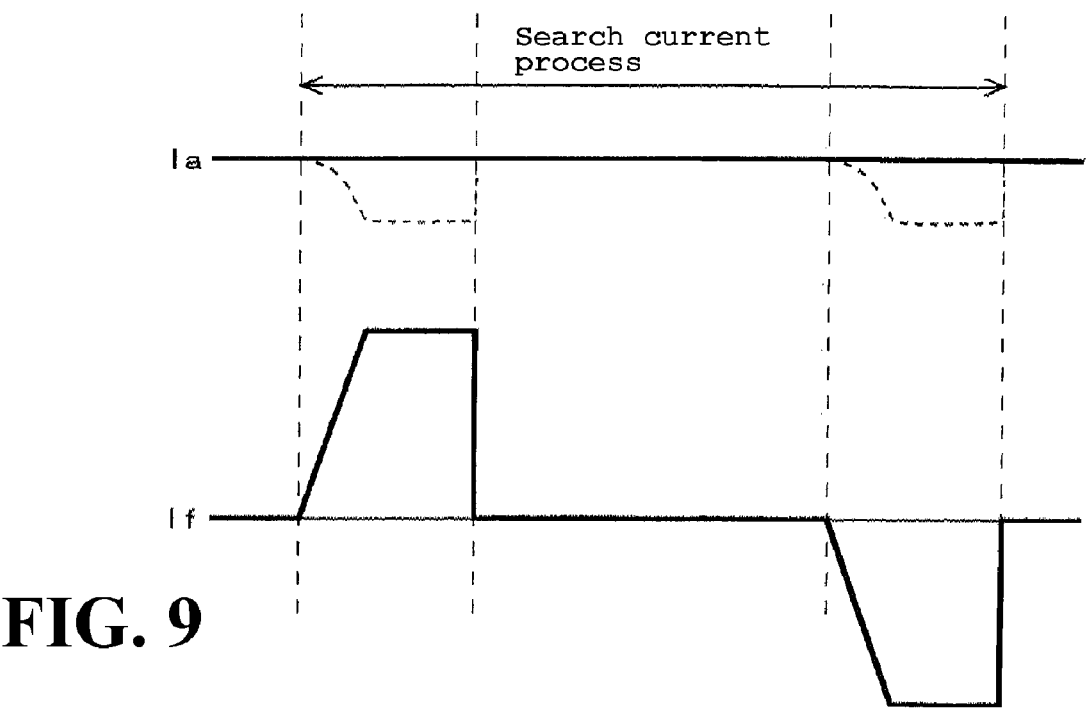
FIG. 9 is a graph showing how the driving direction is determined from the current applied.
Figure 10:
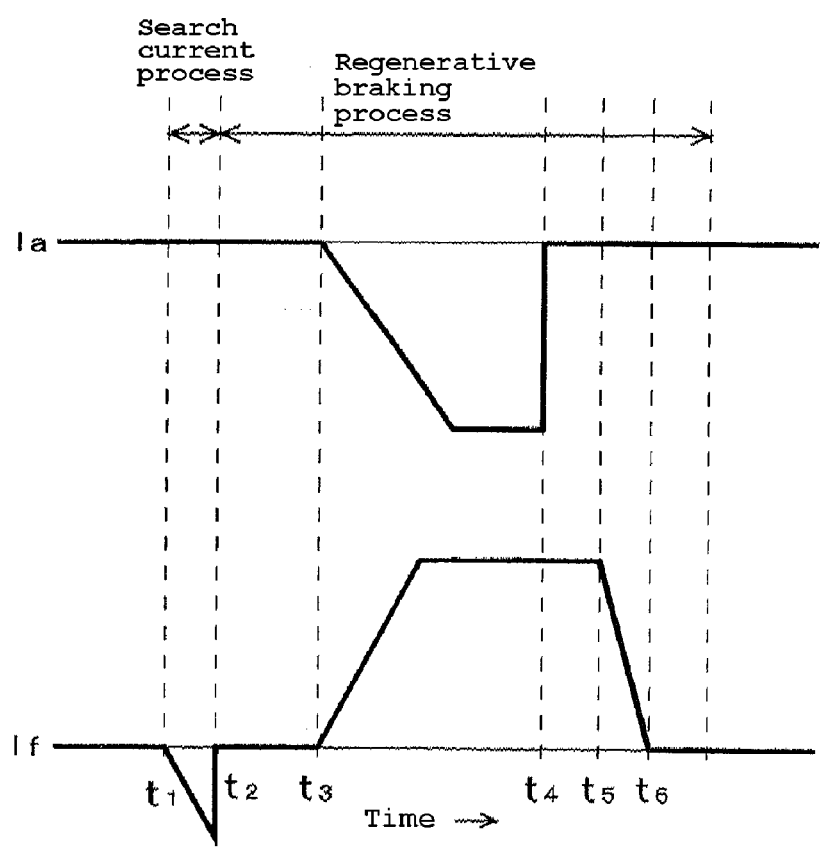
FIG. 10 is a graph, in part similar to FIGS. 4 and 7, of current control of another feature of the invention.

FIGS. 9 and 10 illustrate another embodiment of regenerative braking in a case where an unattended vehicle starts descending on a slope or the like. When no accelerator input is detected and a vehicle speed greater than a specified speed, for example 1 km/h, is detected, the MPU 39 determines the vehicle to be in an unattended driving state. In that case, first it is detected in which direction, forward or reverse, the vehicle is moving.

FIG. 9 is a graph showing a search current process for detecting the direction the vehicle 21 is moving. This is done by applying a search current in either a positive or negative direction of the field coil 44 and finding which direction of applying the search current, positive or negative, results in the detection of current on the armature coil 43 indicated with the dotted curve. The current flowing in the armature coil 43 is the regenerative current. In the event current is detected in the armature coil 43 when a search current in positive direction is applied to the field coil 44, the electric vehicle 21 is determined to be moving forward. In this case, a current (regenerative current) will not be detected if a search current in the negative direction is applied. In contrast, if a current is detected on the armature coil 43 when a search current in negative direction is applied, the vehicle 21 is determined to be moving in reverse direction.

After the driving direction is detected by the search current process of FIG. 9, regenerative braking is started as shown in FIG. 10. The period from time $t_1$ to time $t_2$ of FIG. 10 represents the search current process time shown in FIG. 9. For example, if the vehicle 21 is determined to be moving forward, an armature current Ia is applied so as to produce torque in reverse direction, against the moving direction of the vehicle 21. When the vehicle speed becomes zero at a time $t_4$, the armature current Ia is also brought back to zero.

If the search current applied to the field coil is different in direction, positive or negative, from the field current If for regenerative braking, a time interval of about several milliseconds is required between the time $t_2$ and $t_3$ to securing electric stability. Also, before and after the period of time (between $t_5$ and $t_6$) in which the field current If is lowered with a fixed gain constant, the field current is kept constant for a period of several milliseconds by a timer.

After the vehicle stops the regenerative braking process is concluded and current flow becomes zero both in the armature and field coils 43 and 44.

Figure 11:
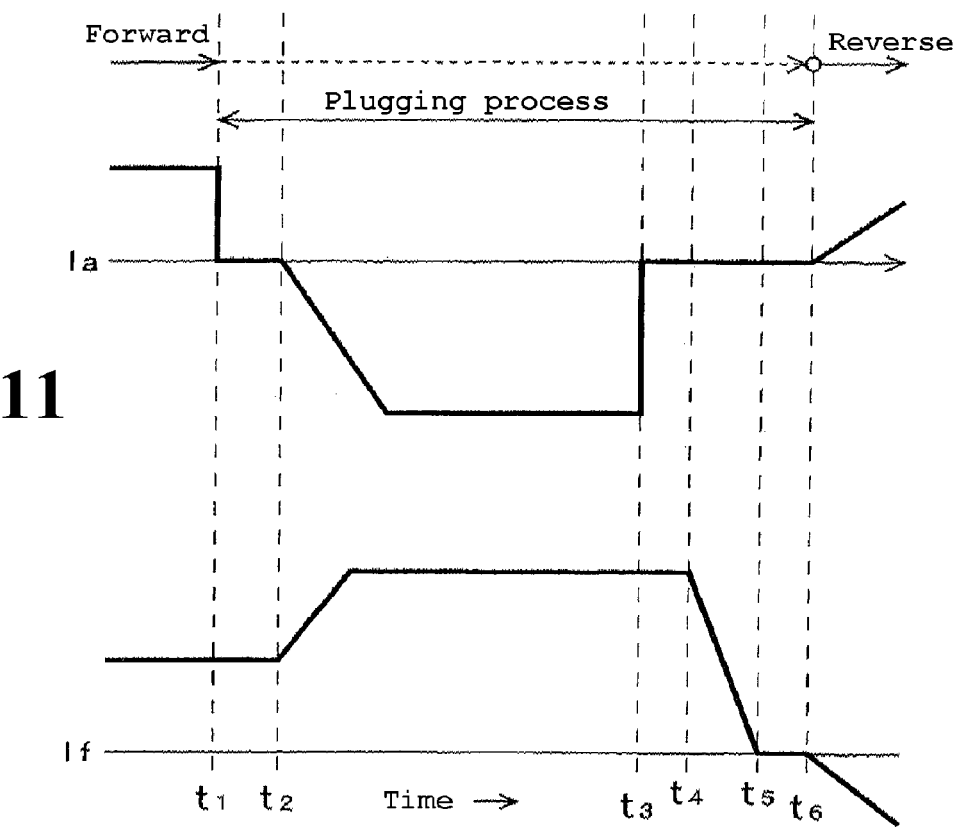
FIG. 11 is a graph, in part similar to FIGS. 4, 7 and 10, of current control of still another feature of the invention.
Figure 12:
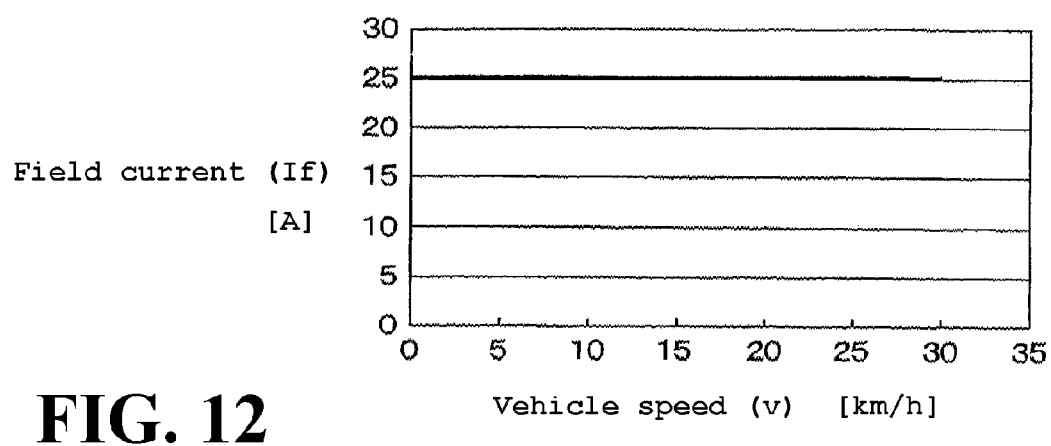
FIG. 12 is a graph used for field current control of the embodiment of FIG. 11.

Referring now to FIGS. 11 and 12, these show are a regenerative braking process in the so-called plugging operation, in which the driving direction, forward or reverse, is switched by operating the direction control switch 33 when driving the vehicle with the accelerator pedal 28 depressed without operating the brake pedal 29 or changing the position of the accelerator pedal 28.

Simultaneously with operating the direction control switch 33 at a time $t_1$ while driving forward, the armature current Ia becomes zero. At the time $t_2$ the armature current Ia flows in the negative direction. In this case, in order that the vehicle 21 moving forward is quickly braked and switched to move in reverse, the field current If is made to be the maximum, 25 amperes, regardless of the vehicle speed as shown in FIG. 12.

When the vehicle speed lowers to a speed of for example 1 km/h just before a stop (at a time $t_3$), the armature current Ia is set to zero, and after a time interval of several milliseconds set by a timer, the field current If is set to zero. Then, again after a time interval of several milliseconds set by the timer, the driving direction is switched at a time $t_6$ to drive in reverse. Incidentally, as the driver continues depressing the accelerator during that time, the field current after the time $t_6$ flows in the reverse driving direction.

It should be apparent that the maps for the current control used in the regenerative braking operations described are only examples and may be appropriately modified according to driving conditions and motor performance, etc. It is possible to perform regenerative braking while monitoring the vehicle speed according to preset limit speed, corresponding to various conditions of use of the electric vehicle, as a golf cart for driving on cart paths with varying grades or for other uses. This invention may be applied to various types of vehicles using a DC shunt motor as a driving source. Of course those skilled in the art will readily understand that the described embodiments are only exemplary of forms that the invention may take and that various changes and modifications may be made without departing from the spirit and scope of the invention, as defined by the appended claims.

What is claimed is:

1. A vehicle having a propulsion device driven by a shunt motor powered from a battery, said shunt motor having an armature coil and a field coil, sensing devices monitoring the current values in said coils during vehicle operation, and a control for determining a condition from measured conditions and applying regenerative braking in an amount determined from the measured values and at a time when regenerative braking is to be applied.

2. A vehicle as set forth in claim 1 wherein the vehicle has an operator controlled speed control for setting a desired speed of the vehicle and an accelerator sensor for sensing when the operator ceases to operate said operator controlled speed control and the regenerative braking is applied upon the sensing of that condition.

3. A vehicle as set forth in claim 2 wherein the regenerative braking is not applied until a predetermined time after the sensing that the operator ceases to operate the operator controlled speed control and only if the operator does not again operate said operator controlled speed control.

4. A vehicle as set forth in claim 3 wherein the current of one of the coils is measured at the time when the operator ceases to operate the operator controlled speed control and the current of the other of the coils is applied at a value derived from a mapped memory of a graph relating the desired current for the other of the coils in relation to the current of the one coil.

5. A vehicle as set forth in claim 1 wherein the vehicle has an operator controlled speed control for setting a desired speed of the vehicle and a sensor for sensing the position of said operator controlled speed control and a sensor for sensing vehicle speed and the regenerative braking is initiated when the position of said operator controlled speed sensor is maintained and the vehicle speed exceeds a preset speed.

6. A vehicle as set forth in claim 5 wherein the regenerative braking is not applied until a predetermined time after speed of the vehicle exceeds the predetermined speed.

7. A vehicle as set forth in claim 6 wherein the current flow to one of the coils is discontinued gradually to zero in accordance with a curve over a second predetermined time and then the other coil is energized in an opposite direction to effect regenerative braking in an increasing amount from a curve relating the current flow in the one coil existing at the time regenerative braking was deemed necessary.

8. A vehicle as set forth in claim 7 wherein the amount current flow in the other coil is held constant when the speed of the vehicle no longer increases and is decreased along a predetermined curve for a given time after the speed of the vehicle falls below the speed of the vehicle falls below the predetermined speed and the predetermined does not again exceed the predetermined speed during that time.

9. A vehicle as set forth in claim 1 wherein the vehicle has an operator controlled speed control for setting a desired speed of the vehicle and a sensor for sensing the position of said operator controlled speed control and a sensor for sensing the direction of vehicle travel and the regenerative braking is initiated when said operator controlled speed sensor is not operated and the vehicle speed exceeds a preset speed.

10. A vehicle as set forth in claim 9 wherein the regenerative braking is initiated by energizing one of the coils in a direction opposite to the direction of travel.

11. A vehicle as set forth in claim 10 wherein the direction of travel is determined by applying a testing current to one of the coils in one direction and applying the regenerative braking to the other of the coils in the opposite direction.

12. A vehicle as set forth in claim 1 wherein the vehicle has an operator controlled direction of travel device for setting a desired direction of travel and a sensor for sensing the when the operator calls for a change in the direction of vehicle travel and the regenerative braking is initiated when said operator controlled direction of travel device is switched between positions to bring the vehicle to a halt.

13. A vehicle as set forth in claim 12 wherein the amount of regenerative braking applied is constant regardless of vehicle speed.

14. A method of regenerative braking a vehicle having a propulsion device driven by a shunt motor powered from a battery, the shunt motor having an armature coil and a field coil, said method comprising the steps of measuring the current values in the coils during vehicle operation, determining a condition requiring regenerative braking from measured conditions and applying regenerative braking in an amount determined in response to the measured values.

15. A method of regenerative braking a vehicle as set forth in claim 14 wherein the vehicle has an operator controlled speed control for setting a desired speed of the vehicle further comprising the step of sensing when the operator ceases to operate said operator controlled speed control and the regenerative braking is applied upon the sensing of that condition.

16. A method of regenerative braking a vehicle as set forth in claim 15 further comprising the step of delaying the regenerative braking for a predetermined time after the sensing that the operator ceases to operate the operator controlled speed control and only if the operator does not again operate the operator ceases said operator controlled speed control.

17. A method of regenerative braking a vehicle as set forth in claim 16 further comprising the step of measuring the current of one of the coils at the time when the operator ceases to operate the operator controlled speed control and setting the current applied to the other of the coils at a value derived from a mapped memory of the desired current for the other of the coils in relation to the current of the one coil.

18. A method of regenerative braking a vehicle as set forth in claim 14 wherein the vehicle has an operator controlled speed control for setting a desired speed of the vehicle further comprising the steps of determining the position of the operator controlled speed control and sensing vehicle speed and initiating the regenerative braking when the position of said operator controlled speed sensor is maintained and the vehicle speed exceeds a preset speed.

19. A method of regenerative braking a vehicle as set forth in claim 18 wherein the regenerative braking is not applied until a predetermined time after speed of the vehicle exceeds the predetermined speed.

20. A method of regenerative braking a vehicle as set forth in claim 19 wherein the current flow to one of the coils is discontinued gradually to zero in accordance with a curve over a second predetermined time and then the other coil is energized in an opposite direction to effect regenerative braking in an increasing amount from a curve relating the current flow in the one coil existing at the time regenerative braking was deemed necessary.

21. A method of regenerative braking a vehicle as set forth in claim 20 wherein the amount current flow in the other coil is held constant when the speed of the vehicle no longer increases and is decreased along a predetermined curve for a given time after the speed of the vehicle falls below the speed of the vehicle falls below the predetermined speed and the predetermined does not again exceed the predetermined speed during that time.

22. A method of regenerative braking a vehicle as set forth in claim 14 wherein the vehicle has an operator controlled speed control for setting a desired speed of the vehicle and further comprising the step of sensing the position of the operator controlled speed control and sensing the direction of vehicle travel and the regenerative braking is initiated when said operator controlled speed sensor is not operated and the vehicle speed exceeds a preset speed.

23. A method of regenerative braking a vehicle as set forth in claim 22 wherein the regenerative braking is initiated by energizing one of the coils in a direction opposite to the direction of travel.

24. A method of regenerative braking a vehicle as set forth in claim 23 wherein the direction of travel is determined by applying a testing current to one of the coils in one direction and applying the regenerative braking to the other of the coils in the opposite direction.

25. A method of regenerative braking a vehicle as set forth in claim 14 wherein the vehicle has an operator controlled direction of travel device for setting a desired direction of travel and further comprising the step of sensing the when the operator calls for a change in the direction of vehicle travel and initiating the regenerative braking when the operator controlled direction of travel device is switched between positions to bring the vehicle to a halt.

26. A method of regenerative braking a vehicle as set forth in claim 25 wherein the amount of regenerative braking applied is constant regardless of vehicle speed.

* * * * *